United States Patent [19]

Piane, Sr.

[11] Patent Number: 4,873,921
[45] Date of Patent: Oct. 17, 1989

[54] MULTIPLE UNIT WOK APPARATUS

[75] Inventor: Robert A. Piane, Sr., Wilmington, Del.

[73] Assignee: Piane Caterers, Inc., Wilmington, Del.

[21] Appl. No.: 219,557

[22] Filed: Jul. 14, 1988

[51] Int. Cl.4 .............................. A47J 37/10
[52] U.S. Cl. .................... 99/422; 99/448; 99/449; D7/354; D7/357; 220/23.4
[58] Field of Search ............ 99/422, 423, 424, 448, 99/449; D7/354, 364, 357; 220/23.4

[56] References Cited

U.S. PATENT DOCUMENTS

| D. 158,214 | 4/1950 | O'Callaghan | D7/357 X |
|---|---|---|---|
| D. 181,298 | 10/1957 | Lax | D7/355 |
| 240,138 | 4/1881 | Jackson | D7/357 X |
| 863,536 | 8/1907 | Hudson | 220/23.4 |
| 1,292,476 | 1/1919 | Kavanagh | D7/357 X |
| 1,855,075 | 4/1932 | Virneburg | D7/357 X |
| 2,006,938 | 7/1935 | Birkenhauer | D7/357 X |
| 2,078,165 | 4/1937 | Schwartz | D7/357 X |
| 2,674,389 | 4/1954 | Baker et al. | 220/23.4 |
| 3,908,828 | 9/1975 | Lohwasser | 220/23.4 X |
| 4,176,593 | 12/1979 | Terzian | D7/357 X |

FOREIGN PATENT DOCUMENTS

| 457540 | 3/1928 | Fed. Rep. of Germany | 99/424 |
|---|---|---|---|
| 487391 | 6/1918 | France | 220/23.4 |
| 865071 | 4/1940 | France | 99/422 |
| 439863 | 4/1949 | Italy | 220/23.4 |
| 468384 | 9/1950 | Italy | D7/357 |

Primary Examiner—Stephen Marcus
Assistant Examiner—Christine A. Peterson

[57] ABSTRACT

A multiple unit wok apparatus is provided for simultaneously cooking separate ingredients and, when cooked, the ingredients can be easily mixed together if desired. The individual wok units preferably have means for detachably interlocking each unit with another, similar unit. Embodiments include double, triple, quadruple and higher multiple unit wok assemblies.

5 Claims, 2 Drawing Sheets

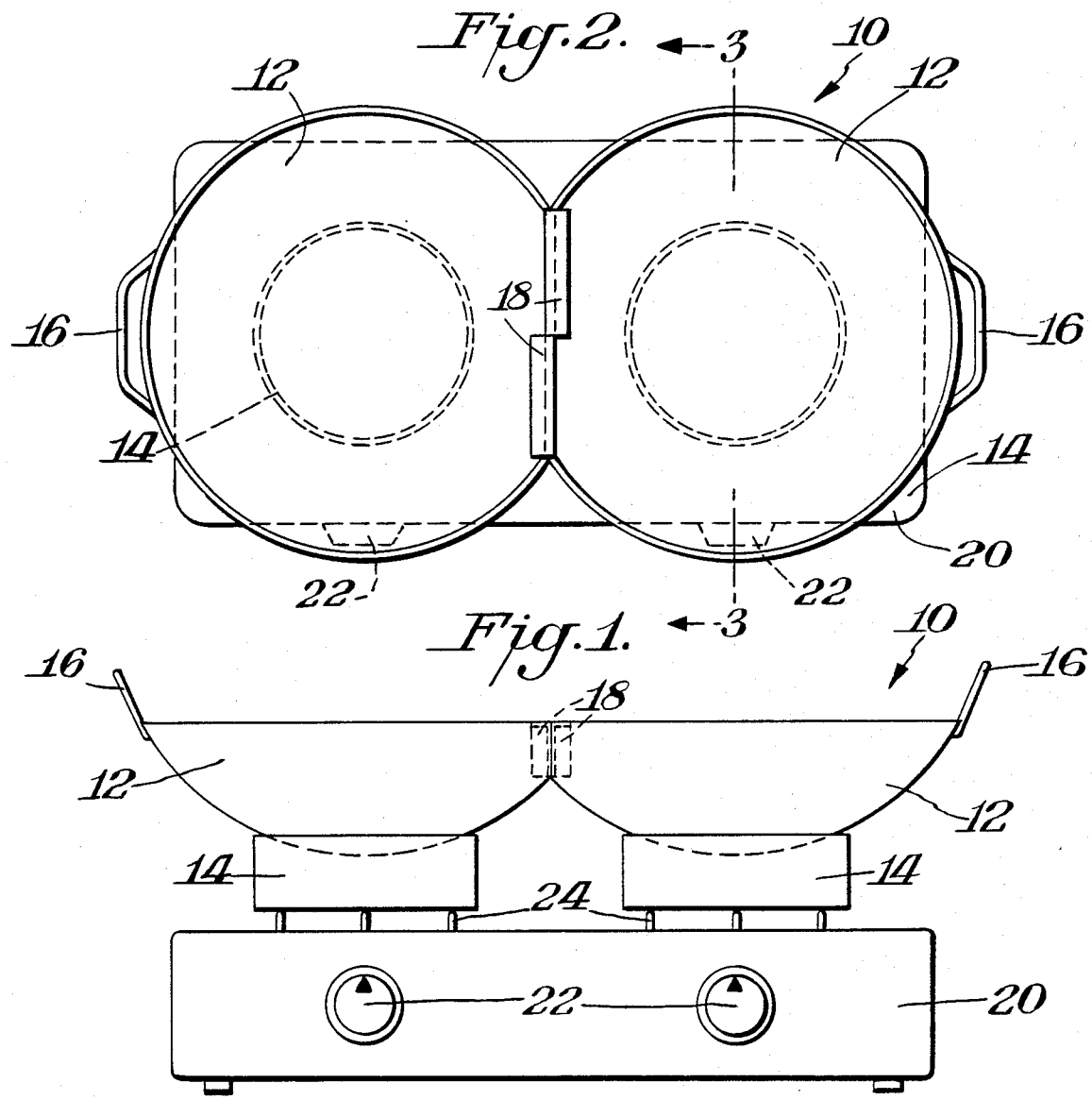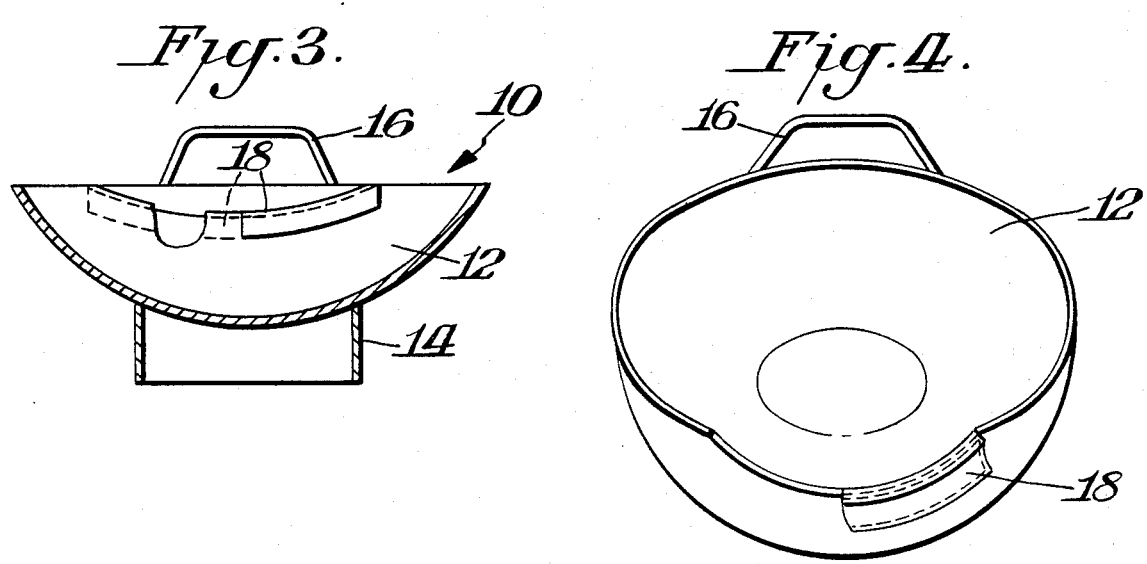

MULTIPLE UNIT WOK APPARATUS

BACKGROUND OF THE INVENTION

This invention relates to apparatus for cooking food, namely the wok.

Cooking food in a wok is an ancient art. The vessel serves many functions and therefore replaces many Western utensils. To prepare many recipes, a cook generally needs two woks, one for oil and one for water steaming.

A single wok is normally about fourteen inches in diameter and is made of carbon steel.

The basic technique of wok cooking include stir-frying, deep frying and steaming. Stir-frying involves cooking precut pieces of food in small amounts of oil over high heat for short periods of time. Deep frying involves the use of considerably more oil than stir-frying, but this oil, rather than the hot surface of the wok, acts as the heat-transfer medium. The oil should be heated to approximately 375 degrees before the food is added. Surprising and pleasing results can often be achieved with this method. In steaming, the wok is used as a water vessel in which either a perforated aluminum tray or bamboo basket is placed. The food platter is placed on top of the tray or basket, covered and steamed over high heat.

One of the objects of the present invention is to provide means for a cook to conveniently and easily employ more than one of these methods of wok cooking simultaneously.

SUMMARY OF THE INVENTION

Multiple unit wok apparatus is provided comprising at least two similar wok bowls detachably affixed together at an intersecting joint therebetween by interlocking connector clamp means, the intersecting joint being arcuate downwardly when the apparatus is in the cooking position, thereby allowing cooked or partially cooked foods and juices to be shifted easily from one wok bowl to another by the cook, using a spoon, spatula or other appropriate tool, with substantially no spillage.

BRIEF DESCRIPTION OF THE INVENTION

FIG. 1 is a front elevational view of a double wok configuration according to the invention.

FIG. 2 is a top plan view of the double wok configuration of FIG. 1.

FIG. 3 is a cross-sectional view, partly broken away, of the double wok configuration taken along line 3—3 of FIG. 2.

FIG. 4 is a perspective view of one of the woks of the invention according to FIGS. 1-3 separated from its mirror-image counterpart.

Figure 5:
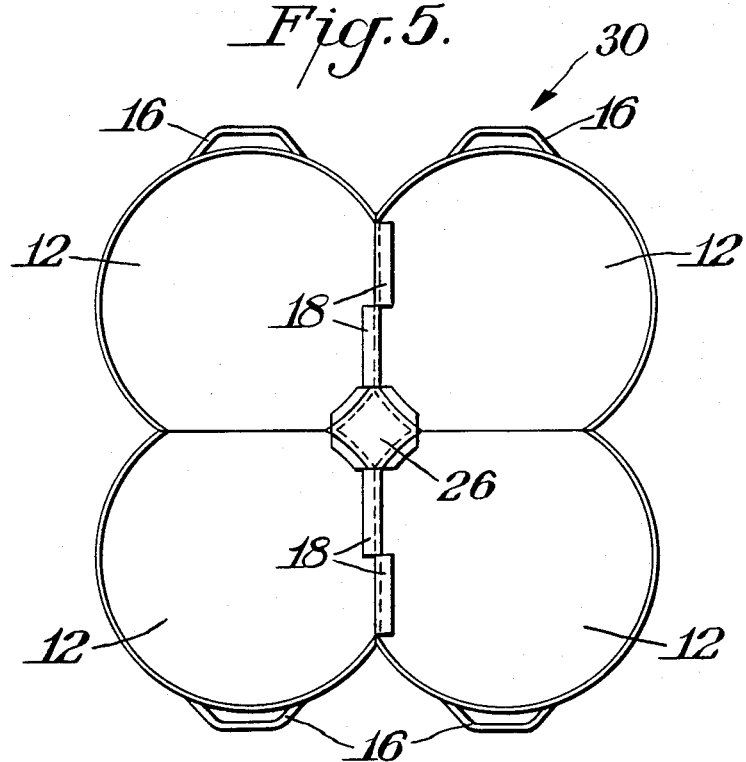
FIG. 5 is a top plan view of a quadruple unit wok configuration according to the invention.

DETAILED DESCRIPTION OF THE INVENTION AND PREFERRED EMBODIMENTS WITH REFERENCE TO THE DRAWINGS

A multiple unit wok apparatus is provided for simultaneously cooking separate ingredients and, when cooked, the ingredients can be easily mixed together if desired. The individual wok units preferably have means for detachably interlocking each unit with another, similar unit. Embodiments include double, triple, quadruple and higher multiple unit wok assemblies.

A detailed description of the invention is best provided with reference to the drawings wherein FIG. 1 is a front elevational view of a double wok configuration according to the invention. The multiple wok apparatus 10 includes two wok bowls 12, each bowl 12 resting on a base 14 and each bowl 12 having a handle 16. The bowls 12 are connected together by connector clamp means 18, described more fully below. The bowls 12 can be connected together as shown, or they may be disconnected for ease of cleaning and storage. The bases 14 are shown resting on grates 24 of stove 20 having adjustable burner control knobs 22. With the double wok configuration shown, a cook can prepare different dishes in each bowl 12, at different heat levels if necessary and, if desired, the different prepared ingredients can easily be combined in one of the bowls 12 at the appropriate time.

FIG. 2 is a top plan view of the double wok configuration 10 showing the two bowls 12 resting on the two bases 14 which in turn sit on stove or burner assembly 20. Flap-type clamps 18, shown as mirror images of each other, snap over the rim of the adjacent bowl 12 and hold the two woks together.

FIG. 3 is a cross-sectional view, partly broken away, taken along line 3—3 of FIG. 2. The flap-type clamps 18 are clamped over the rims of bowls 12 and hold the bowls together. Handle 16 and base 14 are shown for completeness.

FIG. 4 is a perspective view of one bowl 12 having handle 16 and flaptype clamp 18 detached from its mirror image of FIGS. 1-3.

FIG. 5 is a top plan view of a quadruple unit assembly 30 of the invention having four bowls 12 with handles 16 clamped together with flaptype clamps 18 and having cap 26 which also links the bowls 12 together and prevents spillage into the opening of the center of the bowls.

Figure 6:
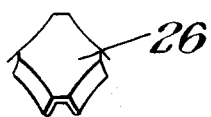
FIG. 6 shows a cap for connecting the four individual wok units shown in FIG. 5 and for preventing spillage.

FIG. 6 is a perspective view of cap 26.

Figure 7:
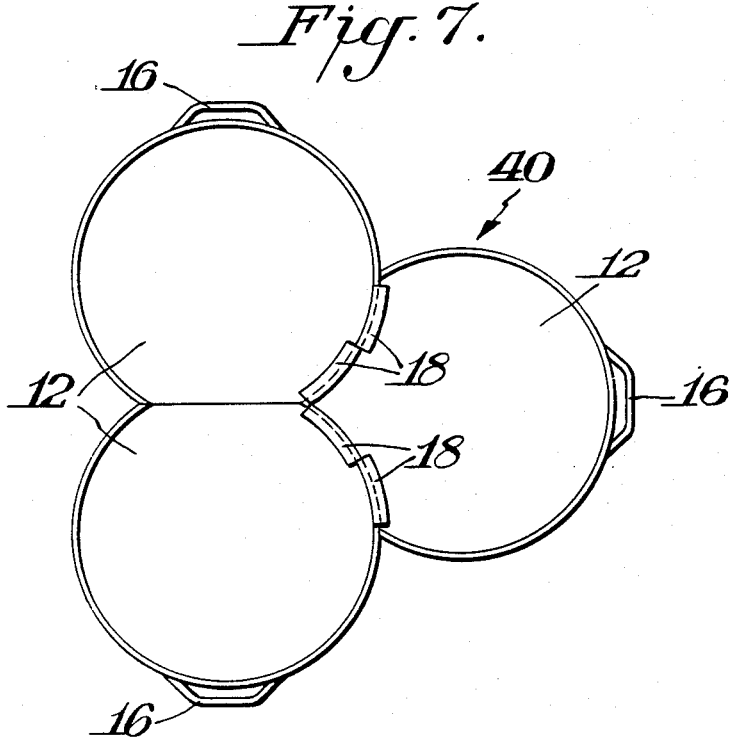
FIG. 7 is a top plan view of a three-unit multiple wok configuration.

FIG. 7 is a top plan view of a three-unit wok configuration 40 showing bowls 12 having handles 16 and being clamped together by clamp means 18. It is to be understood that, while flap-or-leaf-type clamp means 18 have been described, virtually any type of clamp means can be used which will allow for detachably affixing the multiple wok units together.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Multiple unit wok apparatus comprising at least two similar wok bowls detachably affixed together at an intersecting joint therebetween by interlocking connector clamp means, said intersecting joint being arcuate downwardly when said apparatus is in the cooking position, thereby allowing cooked or partially cooked foods and juices to be shifted easily from one wok bowl to another by the cook, using a spoon, spatula or other appropriate tool, with substantially no spillage.

2. The apparatus of claim 1 having two similar wok bowls.

3. The apparatus of claim 1 having three similar wok bowls.

4. The apparatus of claim 1 having four similar wok bowls.

5. The apparatus of claim 1 having a plurality of wok bowls.

* * * * *